Figure 1:
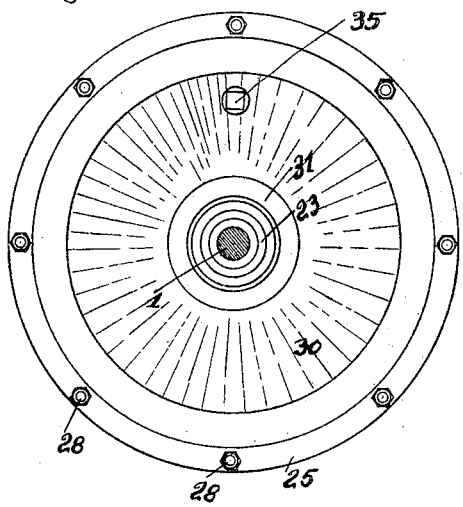

No. 822,034. PATENTED MAY 29, 1906.
E. E. WRIGHT.
CLUTCH MECHANISM.
APPLICATION FILED APR. 17, 1905.

Witnesses.

Inventor
Earl E. Wright,
By
Attorneys.

UNITED STATES PATENT OFFICE.

EARL E. WRIGHT, OF NEW BRIGHTON, PENNSYLVANIA.

CLUTCH MECHANISM.

No. 822,034.

Specification of Letters Patent.

Patented May 29, 1906.

Application filed April 17, 1905. Serial No. 255,931.

*To all whom it may concern:*

Be it known that I, EARL E. WRIGHT, a citizen of the United States of America, residing at New Brighton, in the county of Beaver and State of Pennsylvania, have invented certain new and useful Improvements in Clutch Mechanism, of which the following is a specification, reference being had therein to the accompanying drawings.

This invention relates to certain new and useful improvements in clutch mechanisms, and relates more particularly to a clutch adapted to be used in connection with automobiles and the like vehicles.

The object of this invention is to provide a novel form of clutch mechanism adapted to be used in connection with a wheel loosely mounted upon a shaft; and my invention resides in providing a novel form of mechanism that can be easily and quickly actuated to insure a positive and effectual engagement of said wheel upon said shaft.

Another object of this invention is to provide a dust and dirt proof clutch mechanism that will occupy comparatively small space.

A further object of this invention is to provide a clutch mechanism that can be readily used in factories or works where gas and gasolene engines are used, the construction and operation of my improved clutch mechanism permitting of such engines being started independent of the load, and after they have been placed in full operation my improved clutch mechanism can be gradually operated until the entire load has been assumed by the engine.

A still further object of this invention is to provide a clutch mechanism that will be extremely simple in construction, strong and durable, comparatively inexpensive to manufacture, and highly efficient for the purposes for which it is constructed.

The invention finally consists in the novel construction, combination, and arrangement of parts, which will be hereinafter more fully described, and then specifically pointed out in the claims, and, referring to the drawings accompanying this application, like numerals of reference designate corresponding parts throughout the several views, in which—

Figure 3:
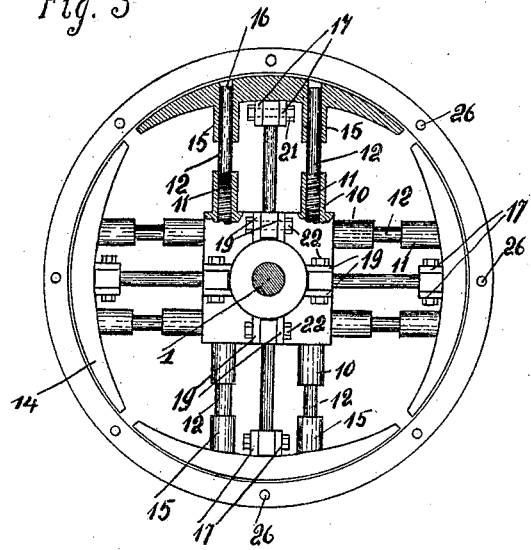
Figure 2:
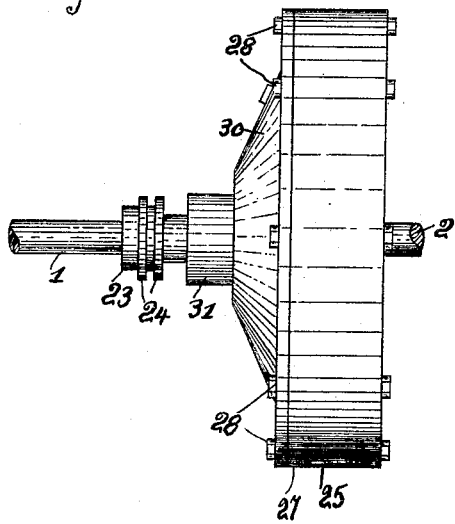
Figure 4:
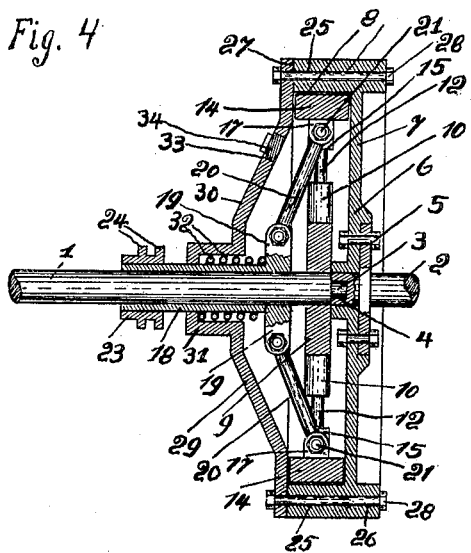

Figure 1 is an end view of my improved clutch mechanism. Fig. 2 is a side elevation view of the same. Fig. 3 is a similar view with one side of the casing of the clutch mechanism removed and the clutch mechanism partly in section, and Fig. 4 is a vertical longitudinal sectional view of the clutch mechanism in its entirety.

In the accompanying drawings I have illustrated my improved clutch mechanism upon two revoluble shafts, and the shaft 1 may represent a driven shaft of a motor or engine, while the shaft 2 may represent the drive or main operating shaft of a machine or vehicle. The end of the shaft 1 is reduced to form a stud 3, adapted to fit within a recess 4, formed in the end of the shaft 2.

Secured by bolts and nuts 5 to the end of the shaft 2 is the hub portion 6 of a fly or pulley wheel 7. The web portion of the fly or pulley wheel is located to one side of the pulley, providing an annular internal surface 8, against which my improved clutch mechanism is adapted to operate.

Upon the end of the shaft 1 confronting the hub portion 6 of the wheel 7 I key or otherwise secure a plate 9, said plate being substantially rectangular in form. The edges of said plate are provided with outwardly-extending standards 10, having threaded recesses 11 formed therein, and in said recesses are mounted a plurality of arms 12, the one end of each arm being threaded to engage in its respective threaded recess.

The reference-numerals 14 designate shoes which are mounted upon the arms 12 and are adapted to engage the annular surface 8 of the wheel 7. Each shoe is substantially segment-shaped and has its under face provided with posts 15 15, each of said posts having a vertically-disposed aperture 16 formed therein, which extends into the body portion of the shoe. These apertures are adapted to receive the arms 12 of the plate 9. The under face of each shoe is also provided with depending pierced lugs 17 17, arranged between the posts 15 15 of said shoe.

The shaft 1 is provided with a movable sleeve 18, the one end of which carries radially-disposed pierced lugs 19, said lugs being arranged in sets, substantially as shown in Fig. 4 of the drawings. Pivotally mounted between the pierced lugs 17 17 and the lugs 19 are rods 20, the ends of said rods being secured in said lugs by nuts and bolts 21 and 22. The opposite end of the movable sleeve 18 is provided with a collar 23, carrying peripheral flanges 24 24, and between said flanges is adapted to engage a fork (not shown) or the like device generally employed for operating clutch mechanisms, particularly in automobiles.

The rim 25 of the wheel 7 is provided with a plurality of transversely-disposed openings 26, and to the face 27 of the rim I secure by bolts and nuts 28 an annular casing 29. The central portion of the casing 29 is flared outwardly, as indicated at 30, and is provided with a collar 31, adapted to surround a part of the movable sleeve 18. Interposed between the flanged end of the collar 31 and the lugs 19 is a coiled spring 32, which surrounds the sleeve 18 and is employed for normally holding the shoes 14 in engagement with the annular surface 8 of the wheel 7.

The flared portion 30 of the casing 29 is provided with a screw-threaded aperture 33, in which is mounted a screw-threaded plug 34, carrying a rectangular lug or nut 35.

The movable parts of my improved clutch mechanism are adapted to operate, if it be desired, in a bath of oil, and for this reason I have provided the screw-threaded opening 33, whereby a suitable lubricant can be placed in the compartment formed by the wheel 7 and the casing 29. When the shaft 1 is rotated, the shaft 2 will revolve in unison with the shaft 1 on account of the shoes 14 engaging the annular surface 8 of the wheel 7, said shoes being retained in engagement with the wheel 7 by the spring 32. When it is desired to operate the shaft 1 independent of the shaft 2, the flanged collar 23 is moved outwardly from the wheel 7, causing the spring 32 to become compressed, and through the medium of the rods 20 the shoes are removed from frictional engagement with the surface 8 of the wheel 7.

I desire to call attention to the fact that when the frictional surfaces of the wheels 7 and the shoes 14 are engaged the rods 20 are relieved of the strain exerted upon them by the arms 12, upon which the shoes 14 are slidably mounted. The fly-wheel or pulley 7 may be used as a drive-wheel by placing a suitable belt over the same, and while I have herein described my improved clutch mechanism as especially designed for automobiles it is equally well adapted to factories using gas or gasolene engines without a load, thus dispensing with the strain caused by the entire load being started by an engine.

Automobiles equipped with my improved clutch mechanism permit of the automobiles being run over rough ground at a high rate of speed by giving the shoes of my improved clutch a slight engagement with the wheel or clutch member, it not being necessary to change the gears in the transmission of power.

While I have herein described the preferred manner of constructing my improved clutch mechanisms, it is obvious that various changes may be made in the detail of construction without departing from the general spirit and scope of the invention.

What I claim, and desire to secure by Letters Patent, is—

1. In a clutch mechanism, the combination with a driven shaft, of a driving-shaft rotatably connected to the end of said driven shaft, a wheel carried by said driving-shaft, a plate mounted upon said driven shaft, outwardly-extending arms carried by said plate, segment-shaped shoes slidably mounted upon said arms and adapted to engage the inner surface of the rim of said wheel, a sleeve slidably mounted upon said driven shaft, rods connecting said shoes and said sleeve, a casing secured to the side of said wheel and inclosing the above-mentioned elements, said casing having an opening formed therein, a plug detachably mounted in said opening, means to normally hold said shoes in engagement with said wheel, and means to move said shoes out of engagement with said wheel, substantially as described.

2. In a clutch mechanism the combination with a wheel having an annular internal gripping-surface, of a shaft revolubly connected to said wheel, a plate secured to said shaft, arms carried by said plate, shoes slidably mounted upon said arms, a sleeve slidably mounted upon said shaft, rods connecting said shoes and said sleeves, a casing carried by said wheel and forming an annular compartment upon one side of said wheel, said casing having an opening formed therein, a plug detachably mounted in said opening, and means to hold said shoes in engagement with said gripping-surface, substantially as described.

3. In a clutch mechanism, the combination with a connected driven shaft and a drive-shaft, of a wheel mounted on the drive-shaft and having an internal gripping-surface, a plate secured on the driven shaft, and having outwardly-projecting hollow standards, rods threaded into said standards, shoes slidably mounted on the outer ends of said rods and adapted to engage the internal gripping-surface of the wheel, lugs carried by said shoes, a sleeve slidably mounted on the driven shaft and having lugs, rods pivotally connected to said lugs and to the aforesaid lugs of the shoes, a collar surrounding a part of said sleeve and connected to said wheel, and having an inwardly-flanged outer end, and a spring surrounding said sleeve between the lugs thereof and the inwardly-flanged outer end of the collar.

4. A clutch for coupling parallel shafts, consisting of a wheel having an internal gripping-surface, a plate, radially-disposed arms carried by said plate, shoes movably mounted on the outer ends of said arms and adapted to engage the internal gripping-surface of the wheel, a movable sleeve, rods pivotally connected to one end of said sleeve and to said shoes, a casing connected to the rim of the wheel, and having a collar surrounding a part of said sleeve, and a spring surrounding the sleeve and inclosed by said casing and collar, substantially as described.

In testimony whereof I affix my signature in the presence of two witnesses.

EARL E. WRIGHT.

Witnesses:
S. H. MAHAN,
J. M. CARGO.